United States Patent [19]

Kaufman

[11] 4,324,349
[45] Apr. 13, 1982

[54] CONTAINER FOR DISPENSING LIQUID

[76] Inventor: John G. Kaufman, 858 Condor Dr., Burlington, Ontario, Canada, L7T 3A7

[21] Appl. No.: 112,014

[22] Filed: Jan. 14, 1980

[51] Int. Cl.³ .............................................. B65D 37/00
[52] U.S. Cl. .................................. 222/207; 222/211; 222/215; 222/185
[58] Field of Search ............... 222/207, 209, 210, 211, 222/214, 215, 464, 564, 547, 185, 181, 525

[56] References Cited

U.S. PATENT DOCUMENTS

| | | |
|---|---|---|
| 1,127,387 | 2/1915 | Alger . |
| 2,889,215 | 6/1961 | Willingham . |
| 3,381,860 | 5/1968 | Armour .............................. 222/211 |
| 3,797,513 | 3/1974 | Hazen .................................. 137/132 |

Primary Examiner—Allen N. Knowles
Attorney, Agent, or Firm—Hirons, Rogers & Scott

[57] ABSTRACT

A container for liquid comprises a substantially airtight body for storing liquid, a means for varying the pressure of gas above the level of liquid in the body of the container, e.g. resilient flexible container walls such as a squeeze bottle, an air pocket structure disposed at the lower end of the container, and in free liquid communication with the body of the container so as to allow entry of liquid from the body of the container into the air pocket structure. Air resides in the air pocket structure when the container is disposed with its lower end downwardly. An outlet passageway has an upper end which communicates near the top of the air pocket structure to be disposed in air in the air pocket and a lower end open to atmosphere exteriorly of the container and the air pocket. Such a container holds liquid therein without dripping. To discharge the liquid, the pressure on the body is increased, so as to cause liquid to rise through the air pocket structure, and issue liquid from the outlet passageway. Upon release of the applied pressure, air is sucked back in through the passageways so as to have a cleaning effect thereon. The structure allows storage of liquid ready for dispensing, but without risk of leakage or dripping, even when exposed to fluctuations in temperature of considerable magnitude.

12 Claims, 3 Drawing Figures

CONTAINER FOR DISPENSING LIQUID

FIELD OF THE INVENTION

This invention relates to containers for liquids, and more particularly to outlet structures for dispensing quantities of liquid from such containers.

BACKGROUND OF THE INVENTION

In many applications, there is a need for a liquid container which can be simply and reliably operated to deliver a small quantity of liquid therefrom, without resulting in deposit of residual liquid in the outlet. In household applications, for instance, there is a need for a liquid dispenser which will deliver small quantities of liquid soap or cosmetic on demand, and remain in clean condition after use. Flexible, squeeze bottles with simple narrow nozzle apertures are commonly used, but such arrangements commonly result in fouled outlet apertures after use over an extended period of time. This is a particular problem with containers of thick, pastey liquids such as liquid soaps, hand creams and other cosmetic preparations.

There is also a need for containers for semi-solid products such as soaps, shaving creams, cosmetic lotions and the like which can be kept in temperature variable environments such as personal bathrooms, showers etc. in an "outlet downward" condition for ease of operation, but which will not drip or leak from the outlet even when subjected to varying environmental temperatures.

There have been proposals in the past for the provision of an air lock between a body of liquid in a container and the outlet conduit from said container, to guard against unwanted liquid leakage therefrom. For example, U.S. Pat. No. 1,127,387 Alger discloses a form of liquid siphon, e.g. for use with automatic flush tanks and liquid meters, in which a temporary liquid seal is formed in the siphon pipe. The inlet end of the siphon pipe is disposed within a liquid-containing tank, and is overlied by a bell-like structure which forms an air lock above the inlet pipe. The liquid seal in the outlet pipe of the siphon prevents admission of air to the discharge leg of the siphon so as to ensure that the siphon catches in a solid stream. As the liquid rises in the tank, air is trapped and compressed in the bell. This has the effect of forcing the water down the U-tube outlet, to start the operation of the siphon.

U.S. Pat. No. 3,797,513 Hazen shows an alternative arrangement of siphon discharge from a flushing tank, in which the inlet to the U-shaped siphon tube within the tank is overlied by an inverted bell structure, forming an air lock at the tube inlet. Water is supplied to the tank from an outside source, to cause the water level in the tank to rise. This traps and compresses air in the bell, and prevents flow of water down the outlet tube until the water level in the tank reaches a pre-determined level. Once this level is reached, water is forced from the U-trap, air is forced out of the bell and the siphon commences operation until the tank is substantially emptied. Then the cycle is repeated, so as to give regular periodic flushing.

U.S. Pat. No. 2,989,215 Willingham discloses a dispenser for a container for liquids. The dispenser includes a spray nozzle, the inlet to which, inside the container, is surrounded by a measuring cup. The liquid may only enter the nozzle from the measuring cup. On inverting the container, the measuring cup is filled with a pre-determined amount of liquid. Then the container is operated, e.g. by squeezing, to discharge the predetermined amount of liquid therefrom. No air lock arrangement is provided in this disclosure.

BRIEF SUMMARY OF THE INVENTION

The present invention provides a container and discharge means therefor, which can be operated to dispense quantities of liquid therefrom, via the intermediary of an air pocket structure overlying the entrance to the discharge passageway. There is provided a means for increasing the pressure in the space above the liquid level, for example a squeezable bottle. Liquid within the bottle is forced through the air pocket as a result of the pressure increase, to discharge the liquid down the outlet passageway and out of the container. Immediately upon release of the applied pressure, air is drawn back through the outlet passageway to restore the air pocket and to restore the normal pressure in the space above the liquid. In so doing, the air flow serves to clean liquid residues from the outlet passageway and to maintain it in satisfactory, sanitary condition. Moreover, in the arrangement according to the invention, the amount of liquid discharged is proportional to the increase in pressure created in the air-filled or gas-filled space above the liquid level in the container. Thus the amount of pressure applied can be regulated so as to discharge the required amount of liquid through the discharge arrangement. In addition, the air pocket arrangement guards against unwanted leakage from the container through the outlet, when the container is mounted in its normal, outlet downwards operative position, and even when subjected to varying temperatures.

BRIEF REFERENCE TO OF THE DRAWINGS

In the drawings, like reference numerals indicate like parts.

DESCRIPTION OF THE PREFERRED EMBODIMENTS

Figure 1:
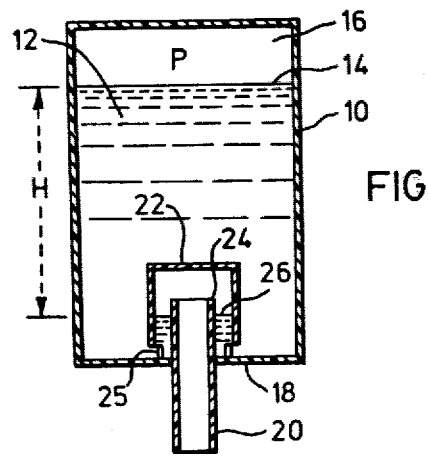
FIG. 1 is a diagrammatic representation of a container and discharge means therefor, illustrating the principle of operation of the present invention.

With reference to FIG. 1, there is diagrammatically illustrated therein a container 10 in the body of which is a liquid 12 extending up to a level 14. An air space 16 is left, above the liquid level 14. Protruding downwardly through the bottom wall 18 thereof and sealed thereto is an outlet passageway in the form of a conduit 20. An air pocket structure in the form of an inverted bell 22 is provided within the body of container 10, secured to the container at a location to overlie the inlet end 24 of the outlet conduit 20, but having free communication with the interior of the container 10 via slots 25. The container body is substantially sealed apart from the outlet conduit 20. When liquid is contained in the container 10 and the container is then disposed as shown in FIG. 1, with the outlet conduit 20 extending downwardly therefrom, a pocket of air is formed in bell 22, communicating with the outlet conduit 20 and hence at outside atmospheric pressure. Liquid enters the bell structure 22 to a level 26, leaving air in the bell 22. In this manner, the container 10 and its contents can be stored in the position shown. Liquid will not escape or drip from the outlet conduit 20, whilst the container is thus left undisturbed. A cap is not necessary.

In order to discharge material from the container, through the outlet conduit 20, the pressure P in the space 16 above the liquid level must be increased by some suitable means. In the case where the container 10 is a resiliently sided flexible bottle, this pressure increase can be achieved merely by squeezing. In other arrangements, the container walls may be mechanically compressed, the vessel may contain a plunger arrangement movable therein to increase pressure, or the gas above the liquid may be heated by suitable means. When this occurs, liquid level 14 tends to fall, and liquid level 26 in the bell structure 22 tends to rise, 22. As the pressure P increases, level 26 eventually rises above the top 24 of outlet conduit 20, and liquid starts to discharge through conduit 20.

When pressure in space 16 is relieved, e.g. by releasing the squeeze on the bottle, pressure P will be less than outside, atmospheric pressure, and consequently, air will be sucked in through conduit 20, through the air pocket structure 22, to bubble up through the liquid 12 to restore the pressure in the space 16. The return of air through conduit 20, occurring substantially immediately after discharge of liquid therethrough, has the effect of cleaning the liquid residues from the side walls of the conduit 20, to maintain it in a clean, sanitary condition between operations. The use of a closure cap, except for shipping purposes, is thus rendered unnecessary.

The amount of liquid to be discharged through conduit 20 of a given structure as shown is proportional to the increase in pressure P in space 16. The apparatus functions according to the general equation:

$$H \times sg + P = \text{atmospheric pressure}$$

where H represents the difference in level between liquid level 14 in the main body of the container, and liquid level 26 in the air pocket structure, P represents the pressure in the gas space above the liquid level 14, and sg represents the specific gravity of the liquid. It can thus be seen that any increases in pressure P above the liquid level must cause a corresponding decrease in H, the liquid head, to operate in accordance with the above equation. Increase in pressure P thus causes a corresponding loss of liquid through the discharge outlet 20, to arrange for the new, required value of H, the amount of discharged liquid depending upon the amount of pressure applied above the liquid level. Upon release of the applied pressure, e.g. by relaxation of the squeeze bottle, air is drawn in to restore pressure P, corresponding to the newly established value of H resulting after the discharge of the quantity of liquid through the outlet conduit. In this way, the amount of liquid discharged is determined by the amount of pressure applied to the space above the liquid.

The use of the air pocket structure 22 in accordance with the present invention ensures that the liquid is maintained within the container whilst the container is at rest, and that there is no risk of dripping or other leakage of the contents through the outlet conduit. The liquid level in the vicinity of the outlet conduit 20 is well below the entrance 24 to the outlet conduit, so that dripping and leakage are avoided. When the pressure is relaxed, air is drawn into the body of the container through the outlet conduit, to clean and dry the outlet conduit itself, to prevent residual drip therefrom as well as to prevent accumulation and resultant clogging of materials therein. It is of course necessary that the container itself be substantially hermetically sealed, apart from the aforementioned outlet conduit, for proper control of the pressure above the liquid level.

With the structure according to the invention, there must be a certain, finite increase in pressure P above the liquid level, before any liquid issues from conduit 20, so as to cause a sufficient rise of liquid in the air pocket structure 22. As a consequence, a device according to the present invention is eminently suitable for use in environments of variable temperatures. An example is the use for containing soaps, shampoos, cosmetics and the like in a personal bathroom or shower closet. A squeeze bottle equipped with outlet means as described herein can be mounted on the wall of the shower closet, with the outlet passageway extending downwardly, and can contain shampoo, for example. When the shower closet is in use, the temperature therein may rise considerably, with consequent increase in pressure P within the bottle. This will cause rise of liquid level 26 in the air pocket structure 22, but no liquid will issue from outlet conduit 20 until there has been a sufficient increase in P to raise liquid level 26 over the entrance 24 of the outlet conduit 20. By suitable adjustment of the height of the bottom of the air pocket structure 22 relative to the top end 24 of the outlet conduit, therefore, the device can be arranged to withstand the range of temperature changes without leakage, and without requiring the use of a capped discharge conduit. In the embodiment shown in FIG. 1, the outlet conduit is height adjustable relative to bottom wall 18, by sliding adjustment, whilst structure 22 is fixed.

Figure 2:
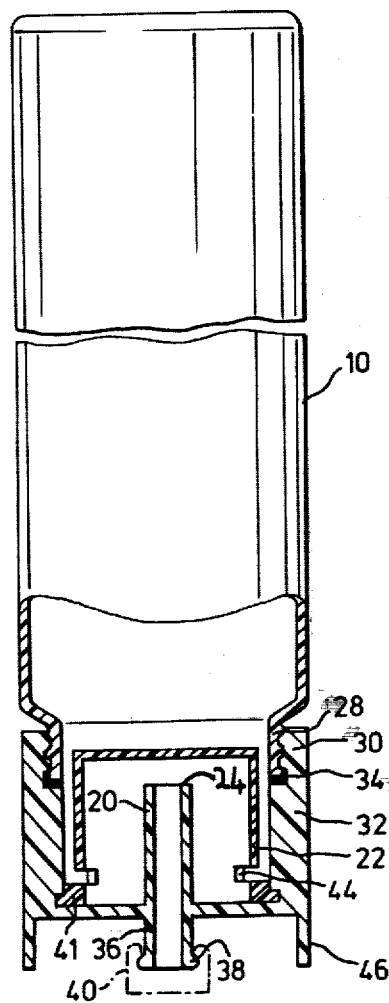
FIG. 2 is a cross sectional view of a practical embodiment of a container and discharge means according to the invention.

With reference to FIG. 2, the container 10 shown therein is a flexible walled, squeeze bottle, terminating at its lowermost end in a narrower, screw threaded neck 28. The neck 28 is releasably received in a complementary upwardly presented female screw thread 30 on an outlet closure 32, through the intermediary of a resilient sealing gasket 34. The body of the closure 32, which is generally cylindrical in shape, contains therein an integral outlet passageway or conduit 20, the upper end 24 of which is disposed near the upper, screw thread 30 thereof, and the lower end 36 of which projects beyond the bottom wall 18 of the closure, to terminate in an enlarged radial bead 38. A snap-fitting releasable cap 40 is fitted over the bead 38, to protect against leakage during transportation.

The body of the closure 32 also contains therein an air pocket structure 22 in the form of an inverted bell, having a radially outwardly extending lip 41 which is a snap fit in a radial groove 42 in the bottom of the side wall of the closure 32. The side wall of bell 22 has a series of radially presented slots 44 which allow liquid communication between the body of closure 32 and hence the interior of container 10, and the bell 22. The bottom wall 18 of the closure 32 is provided with downwardly extending integral legs 46 so that the assembly may be free-standing, clear of the lower end 36 of the closure outlet when cap 40 is removed.

The operation of the device shown in FIG. 2 will be clear from the above description and FIG. 1. When the assembly is put in the position shown in FIG. 2, liquid from container 10 enters the bell 22 through slots 44 to form an air pocket between the body of liquid and the outlet conduit 20. Cap 40 may be removed, and the liquid contents will not drip or leak from the outlet. The container will withstand temperature variations so long as liquid does not rise in the bell 22 sufficient to enter conduit 20. To discharge material therefrom, container 10 is squeezed, to cause liquid to rise in bell 22 and discharge liquid down conduit 20. As soon as the squeezing pressure is relieved, the relaxation of the container 10 acts to draw air in through conduit 20, thereby effecting cleaning of the conduit and restoring the air pocket in bell 22.

Container 10 is a disposable item, which when empty can be unscrewed from engagement with closure 32. Another, filled squeeze container 10 can then be replaced in the closure. The closure may if desired be wall mounted, as a permanent receptacle for liquid containers. The closure is suitably made of semi-rigidplastics material. It is a simple, economical 2-part construction with bell 22 being a simple snap fit in the closure body as shown.

Figure 3:
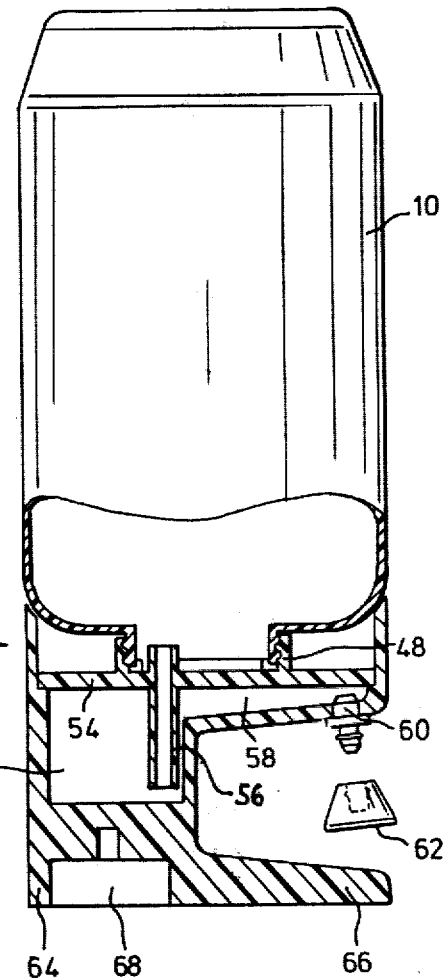
FIG. 3 is a similar cross sectional view of a second embodiment of the invention.

FIG. 3 shows an embodiment of the invention which is in many respects similar to that of FIG. 2. It also comprises a squeeze bottle 10 containing liquid, the neck of which is threadably received in a complementary threaded neck 48 of a closure 50. Within the closure 50 is a chamber 52 defining an air pocket and bounded at the topside by a top wall 54 on which the end of the container neck is disposed, the chamber 52 being entirely exterior to the bottle 10. A depending conduit 56 extends from the neck 48 to the closure 50 and through the top of and into the lower part of the chamber 52, so that liquid from container 10 can enter chamber 52, downwardly through conduit 56 when the container is disposed neck downwards, as shown.

The top wall 54 and chamber 52 extend laterally forwardly a substantial distance from conduit 56 forming a narrow forward chamber portion 58. At the lower forward extremity of chamber portion 58, there is provided an outlet aperture 60, with a releasable cap 62 therefor the chamber portion 58 sloping downwardly from the outlet aperture 60 to the lower portion of the chamber 52. The lowermost surface of closure 50 is provided with legs 64 and a forwardly extending base 66, on which the assembly may rest. The base 66 and forward chamber portion 58 define a bight formation therebetween, in which is located the outlet aperture 60. Bottom recess 68 in the base provides a storage facility for cap 62.

It will thus be noted that the outlet aperture 60 in the embodiment is laterally displaced from the conduit 56, the chamber 52 and the air pocket structure. The operation is substantially the same as previously described. Liquid from container 10 will enter chamber 52 to a certain level therein. Increase of pressure above the level of liquid in container 10 will cause liquid to exit via outlet aperture 60. Release of pressure in container 10 will cause air to draw back through aperture 60 and into chamber 52. This arrangement is particularly useful for a free-standing device, in which the user can place a hand between base 66 and chamber portion 58, to receive material from aperture 60.

As noted in connection with the embodiment of FIG. 1, the height of the top entrance 24 of outlet conduit 20 above the equilibrium level 26 of the fluid in the air pocket structure 22 determines the amount of pressure to be applied before liquid is discharged. Similarly, this height provides the temperature change tolerance before discharge. It is therefore of advantage to make the outlet passageway adjustable relative to the air pocket structure, to tolerate different temperature variations. In FIG. 1, this is done by sliding adjustment of the outlet passageway. In alternative embodiments, this can be achieved in other ways such as by rotation or angular adjustment of the outlet passageway or the air pocket structure, resulting in alteration of the separation therebetween.

Whilst specific preferred embodiments of the invention have been described and illustrated in detail herein, these are not to be construed as limiting. The scope of the invention is limited only by the scope of the appended claims.

What I claim is:

1. A liquid dispenser comprising:
   a squeeze bottle for containing a supply of liquid to be dispensed;
   an opening formed in the underside of said squeeze bottle to enable the liquid to be inserted into said squeeze bottle with said squeeze bottle in an inverted upwardly open position; and
   a closure for closing said opening;
   said closure forming a base for said squeeze bottle and including:
   means for sealingly connecting said closure to said squeeze bottle around said bottle opening;
   a chamber defining an air pocket in an upper portion thereof;
   a liquid passageway connecting a lower portion of said chamber through said bottle opening to the interior of said bottle; and
   a liquid outlet connecting said air pocket to the external atmosphere.

2. A liquid dispenser as claimed in claim 1, wherein said chamber is located entirely at the exterior of said bottle.

3. A liquid dispenser as claimed in claim 1, wherein said liquid passageway communicates with the interior of said bottle through the top of said chamber.

4. A liquid dispenser as claimed in claim 1, wherein said chamber includes a downwardly sloping chamber portion, said liquid outlet communicating with said downwardly sloping portion.

5. A liquid dispenser as claimed in claim 1, wherein said closure comprises a cap for said bottle and said chamber is accommodated entirely within said cap.

6. A liquid dispenser, comprising:
   a bottle for receiving and storing a supply of liquid to be dispensed;
   said bottle defining in the lower end thereof an opening through which the supply of liquid can be fed into said bottle;
   means for closing said bottle opening;
   said closing means comprising a closure member and means for connecting said closure member to said bottle in a liquid tight manner around said opening; and
   said closure member comprising an air pocket structure for retaining a pocket of air; a liquid passageway communicating from a lower portion of said air pocket structure through said bottle opening with the interior of said bottle and a liquid outlet providing communication between said pocket of air and the exterior of said dispenser; and
   means for producing a pressure increase within said bottle to expel liquid through said liquid outlet.

7. A liquid dispenser as claimed in claim 6, wherein said means for producing a pressure increase comprises a resiliently deflectable wall of said bottle.

8. A liquid dispenser as claimed in claim 6, wherein said closure connecting means comprise readily separably interengaging portions of said closure member and said bottle.

9. A liquid dispenser as claimed in claim 8, wherein said bottle has at the underside thereof a neck defining said opening and said interengaging portions comprise screw threads on said neck and said closure member.

10. A liquid dispenser as claimed in claim 6, wherein said air lock structure is provided at the exterior of said bottle.

11. A liquid dispenser as claimed in claim 10, wherein said liquid passageway communicates through the top of said air pocket structure and through said opening with the interior of said bottle.

12. A liquid dispenser as claimed in claim 6, wherein said air pocket slopes downwardly from said liquid outlet to said lower portion of said air pocket structure.

* * * * *